United States Patent
Komsi et al.

(10) Patent No.: US 7,024,228 B2
(45) Date of Patent: Apr. 4, 2006

(54) MOVEMENT AND ATTITUDE CONTROLLED MOBILE STATION CONTROL

(75) Inventors: Asko Komsi, Cambridge, MA (US); Robert C. Rolnik, Southlake, TX (US)

(73) Assignee: Nokia Corporation, Espoo (FI)

( * ) Notice: Subject to any disclaimer, the term of this patent is extended or adjusted under 35 U.S.C. 154(b) by 689 days.

(21) Appl. No.: 09/834,197

(22) Filed: Apr. 12, 2001

(65) Prior Publication Data
US 2002/0193080 A1 Dec. 19, 2002

(51) Int. Cl.
*H04B 1/38* (2006.01)

(52) U.S. Cl. ...................... 455/566; 455/418

(58) Field of Classification Search ............ 455/550.1, 455/556.1, 556.2, 575.1, 418–419, 567, 566, 455/569.1, 569.2
See application file for complete search history.

(56) References Cited

U.S. PATENT DOCUMENTS

| | | | |
|---|---|---|---|
| 5,212,476 A | 5/1993 | Maloney | |
| 5,224,151 A * | 6/1993 | Bowen et al. ............ | 455/569.1 |
| 5,302,968 A * | 4/1994 | Heberle ...................... | 345/671 |
| 5,307,055 A * | 4/1994 | Baskin et al. ................ | 345/2.2 |
| 5,758,267 A * | 5/1998 | Pinder et al. .............. | 455/90.2 |
| 5,802,506 A | 9/1998 | Hutchison | |
| 5,846,086 A | 12/1998 | Bizzi et al. | |
| 6,067,046 A * | 5/2000 | Nichols .................. | 342/357.14 |
| 6,067,460 A | 5/2000 | Alanara et al. ............. | 455/574 |
| 6,195,559 B1 | 2/2001 | Rapeli et al. | |
| 6,311,078 B1 * | 10/2001 | Hardouin .................... | 455/567 |
| 6,353,814 B1 | 3/2002 | Weng | |
| 6,411,828 B1 | 6/2002 | Lands et al. | |
| 6,442,404 B1 * | 8/2002 | Sakajiri ....................... | 455/557 |
| 6,487,421 B1 * | 11/2002 | Hess et al. ............... | 455/550.1 |
| 6,529,144 B1 * | 3/2003 | Nilsen et al. ................. | 341/20 |
| 6,560,467 B1 * | 5/2003 | Kim .......................... | 455/567 |
| 6,577,849 B1 * | 6/2003 | Eaton et al. ............... | 455/3.01 |
| 6,603,420 B1 * | 8/2003 | Lu ............................ | 341/176 |
| 6,681,120 B1 * | 1/2004 | Kim ........................ | 455/556.1 |
| 2001/0014616 A1* | 8/2001 | Matsuda et al. ............ | 455/567 |

OTHER PUBLICATIONS

Harrison, Beverly L. et al.; "Squeeze Me, Hold Me, Tilt Me! An Exploration of Manipulative User Interfaces"; CHI '98; Apr. 18-23, 1998; pp. 17-24; CHI 98 Los Angeles, CA, USA.

(Continued)

*Primary Examiner*—Lee Nguyen
(74) *Attorney, Agent, or Firm*—Harrington & Smith, LLP

(57) ABSTRACT

A mobile station embodiment (400) is provided with a reflection detector (401) which may provide supplemental inputs along with keys (402) such that a character encoding, such as, e.g. ASCII, is selected on the basis of the reflection detector (401) alone, or in combination with keys (402) either pushed down or released. A movable target or pendulum (405) may provide an ability to sense the near space along a direction that the reflection detector is sensitive to. Signals may be transmitted from the reflection detector (401) and pass across a void or other great distance before being reflected, if at all. If such signals are reflected toward the reflection detector (401), and the signals have not been overly attenuated, the reflection detector (401) may provide a 'reflect' signal to any on-board processor of the mobile station (400). The pendulum (405) may be influenced by wind, gravity or acceleration (405) to operate as a reflector to cooperate with the reflection detector (401) and generate a 'reflect' signal.

18 Claims, 4 Drawing Sheets

OTHER PUBLICATIONS

Bartlett, Joel F.; "Rock 'n' Scroll Is Here to Stay"; Information Appliances; May/Jun. 2000; pp. 4045; 0272-1716/2000 IEEE.

Verplaetse, C.; "Inertial Proprioceptive Devices: Self-Montion-Sending Toys and Tools"; IBM Systems Journal, vol. 35, Nos. 3&4, 1996; pp. 639-650; 0018-8670/96.

* cited by examiner

MOVEMENT AND ATTITUDE CONTROLLED MOBILE STATION CONTROL

FIELD OF THE INVENTION

The invention relates to a means for influencing a processor operation based on the present orientation, rotation, acceleration or other environmental factors of a input device, and more particularly to a user interface used to respond, forward, and dispatch messages, including those having program instructions, as well as respond, route and prioritize multimedia streams prepared for transmission over a wireless network.

BACKGROUND OF THE INVENTION

Desktop computers, as popularized by the Personal Computer (PC) of the 1980s, depended heavily on keyboards for data input and control. Additional flexibility occurred shortly afterward by the use of mice and other pointing devices. The keyboard permitted rapid inputs—to the limits of expert touch typists, while mice permitted rapid operation of ephemeral controls such as pull-down and pop-up menus. Such input devices are so pervasive now, that after several generations, the keyboards have been designed to unfold, and pointing devices have been reduced to miniature joysticks positioned in the interstices between keys. This has led to miniaturization of the user interface to snuggly fit under a display in most laptop computers. Even PDA form-factors have been accommodated with keyboards that fold up in a manner similar to accordions.

While computers have long been constructed for serious, deliberative work, and occasionally games, the efforts by makers of mobile stations, particularly mobile telephones, have provided devices that put a premium on compactness, and secondarily addressed issues such as getting serious, non-voice work done. Consequently, advances in user interface have concentrated on making the mobile station perform voice functions ever-so-quickly and with minimal demands of attention from, e.g. eyeballs. This push has led to innovations such as one-touch dialing, last (and second-to-last, and third-to-last) number redial, and voice recognized dialing.

The mobile telephone is a mobile station having all mechanical parts and electrical circuits necessary to make the digital entries, e.g. keypads, graffiti surfaces, roller-keys, and display output, e.g. LCDs, lights or other visual stimuli. Such mechanical parts and electrical circuits are not essential to the operation of a mobile station operated for its central purpose of transmitting and receiving voice frequencies.

Even further leading to the drive of making the ubiquitous mobile telephone unobtrusive and invisible is a movement to make phone operation relatively hands-free, such as, by addition of a handset or speaker phone that permits operation of the phone while focussing eyes and hands on other activities.

Concurrent with a design evolution of ever-smaller mobile phones, has been a improvement in various proprioceptive sensors or motion sensors—both in size and in price. A proprioceptive sensor is a sensor that has the ability to sense the position or orientation or movement of itself without the need to sense pressure on a button or a connection with a contacting external conductor. Proprioceptive sensors include inclinometers, accelerometers, gyroscopes and compasses among others. Proprioceptive sensors do not include limit switches or other devices that require contact with an external object for proper operation. Proprioceptive sensors operate on a number of different principals that detect the force of gravity, accelerations such as caused by vibration, centripetal forces among others. Some devices may operate without reference to outside objects or entities. For example, a gyroscope will typically indicate a change from a starting position, wherein the starting position is arbitrary. On the other hand, inclinometers typically are highly influenced by, and thus are referenced to the center of the earth's gravitational pull, and thus tend to operate with reference to this well known location.

Motion sensing has been in use many years for such things as security systems, weapon systems, spacecraft among others. Inertial sensors such as accelerometers and gyroscopes have aided aircraft and submarines for decades now.

Externally referenced sensors include infrared reflection sensors, sometimes called electronic eyes. Such a sensor detects position relative to another object. In the case of the infrared reflection sensors, the device provides one signal when there is a direct line of sight to a nearby reflector, and another signal when there is no direct line of sight to a nearby reflector. In many cases, an infrared reflection sensor is very cheap compared to more sophisticated proprioceptive sensors, e.g. gyroscopes. Moreover, infrared is well understood in terms of sizing and packaging, and easily incorporated into many devices, though for generally higher value-added functions of communications.

The mobile phone type of mobile station has inherited the nearly universal 12-key arrangement of its desktop predecessors, i.e. the digits 1 through 10 and the pound '#' and star '*' keys. The relative shrinkage in the mobile phone form factor concurrently has driven keytops to be reduced such that the surface area of all keys tends to be smaller than the combined surface area of four keys of a typical QWERTY keypad. The keypad's ergonomics have come under increasing scrutiny as a critical mass of users of the Short Messaging Service available in Global Systems for Mobiles (GSM) (and other systems) has been achieved. In other words, so many people have access to a phone-as-messenger, that billions of brief text-based messages are exchanged globally each month. The success of this mode of communication has even surprised the architects of the GSM standard.

Heavy use of a keypad may be necessary when a mobile station supports forms of internet browsing, such as Wireless Application Protocol (WAP) and I-mode. One response to heavy text input has been U.S. Pat. No. 5,818,437, "Reduced keyboard disambiguating computer", which may be implemented in the popular T9™ user interface. T9 requires a substantial memory space to be devoted to store at least one language database. Nevertheless, the T9 interface rarely provides accurate translation to intended words and names in situations where abbreviations, family names, school names, website addresses, slang, street names or small company names are being input.

Computer text handling involves processing and encoding. Consider, for example, a word processor user typing text at a keyboard. The computer's system software receives a message or signal that the user pressed a key combination for "T", which it encodes, using a character encoding standard such as Unicode, as U+0054, a number. The word processor stores the number in memory, and also passes it on to the display software responsible for putting the character on the screen. The display software, which may be a window manager or part of the word processor itself, uses the number as an index to find an image of a "T", which it draws on the monitor screen. The process continues as the user types in more characters.

It should be noted, that a character encoding is an abstract entity which may correspond to a mark made on a display or paper, known as a glyph. Such a character encoding may just as easily be used as a command to control, e.g. a game display. A character encoding may correspond to glyphs such as letters in the Latin alphabet, or to pictograms in a Chinese alphabet. A glyph may have different forms, such as may be provided by a font. A glyph may be presented in a number of different ways, controlled by application software. Such ways may include point size variations, color variations and various ornamentation to a character, such as by way of underlining or italicizing.

Just as keyboards may provide a control mechanism for generally desk-bound computer games, a keypad of a mobile station may be relied upon to provide inputs for computer mediated games, either built-in or accessed wirelessly. This may provoke wear on the diminutive 12-key keypad, as well as occasional discomfort in a user's hands. To extend the life of keypads, and diminish unsightly wear on the outer cover of a mobile station, it would be helpful if a non-impact input method could be used to produce or simulate game inputs, which may appear as code point entries or character encodings.

Complexity of a digital mobile phone has risen markedly in recent years. The Nokia 6100 series of mobile phones, provided nine main menus of functionality. Each menu averages about four submenus. Frequently a list of choices under the submenu is provided. A manual to describe the features has over 70 pages. Even more pages are in manuals of the new variants of the Nokia 6100 mobile phone which provide a text message origination feature. Supplemental contextual help may be displayed on the small screens of such mobile phones, but many features remain inaccessible to people because the features are buried within an increasingly convoluted menu tree. One way to alleviate such difficulties is to make common features a one to three keystroke task. Examples include:

One-touch dialing, wherein a continuous press of a button causes a call to be made to a preset number;

Keypad locking and unlocking, wherein two keystrokes enable and disable the feature;

Profile swapping, wherein a rapid press of a button associated with the power-on function and a two-stroke menu selection choose the loudness and melody (among other) of incoming calls.

Such features, using an economy of user inputs, are very easy to learn and tend to be disseminated also by word of mouth. Unfortunately, a person's ability to remember keystroke sequences is limited, and it is likely that for most people, no more features can be remembered than are available in the current phone models being made. Moreover, word-of-mouth training is best achieved where the control mechanism is simple, particularly if it requires no knowledge of alphanumeric symbols.

In many western cultures amongst school aged children, there is a minority of kids that get caught up in a trading culture or fad; e.g., trade in baseball cards, Pokemon™, Magic: the Gathering. Such a culture of face-to-face discussion, swapping, gaming based on portable trading elements has created a large following of hobbyists. An electronic trading system that may be similar to such a trading system is shown by U.S. Pat. NC13994, (Mobile entities) wherein electronic agents having multimedia capabilities may be transmitted by, e.g. wireless modes, between supporting hardware, e.g. mobile stations. It would be beneficial to overlay a UI onto a mobile phone interface to facilitate such trade and interaction with mobile entities or other forms of agents. Unfortunately, this creates yet another menu branch in an already detailed menuing system—which amounts to clutter to people not engaged in such a trading culture. Nevertheless, such Mobile entities, which may be elaborate scripts, may be commanded to transmit themselves by short wireless links to a nearby device. Triggering such a transfer also requires an input method.

Incoming calls may occur at inopportune times. Examples include, during a meal, while exercising or while traveling. Stories in the press describe situations where people take calls in movie theaters, and even a case of a doctor taking a call during surgery. Often, it would be helpful to inform a caller of the context in which a call is received—or even to provide a uniformly simple and visible way to silence operation of the ringer. Nevertheless, a principal way of dealing with an inopportune call, for at least 20 years, is to permit a voice messaging system to make a voice recording of the caller. An educated guess as to the condition of the owner of a phone can be discerned if it is known what position a phone is in or what sort of vibrations or other accelerations are acting on it, including acceleration due to gravity. For example, a mobile station is frequently stored in a fixed position in relation to a dashboard when a user of the mobile station is driving. If a calling party were to know this, such a caller would be in a position to be more conscientious concerning the duration and subject matter of their call. Less time could be spent inquiring about the driver's current status and location, and more conversation time could be spent discussing the matter at hand.

In addition, a universally understood act of politeness, visible at a distance, would help assure people that in situations calling for respectful silence, the phone will remain silent.

SUMMARY OF THE INVENTION

An embodiment of the invention may be a user status device in providing data to a processor for controlling a function. The user status device may have a proprioceptive sensor having an orientation state. A conduit may connect the proprioceptive sensor so that orientation state information controls a function.

A second embodiment of the invention may control an agent in a mobile station having at least one wireless transmitter. A step of the second embodiment may detect a changed orientation of the mobile station. Another step of the second embodiment may be a transmitting step, whereby a message option is transmitted through the at least one wireless transmitter.

Yet another embodiment of the invention may send a feedback response to a calling voice device. The invention may detect at least one acceleration during a time interval. When the embodiment detects an incoming signal from the calling device, the embodiment may select an announcement based on the at least one acceleration. In addition the embodiment may transmit the announcement.

One or more of the embodiments may eliminate the need for multiple key-presses to select a character encoding where several possible character encodings are assigned to the same key. In addition an embodiment may accomplish this with fairly compact databases that need not be language specific.

One or more of the embodiments may be amenable to text entry of acronyms, abbreviations and slang in that singlestroke-per-character entries may be accomplished for such words not commonly found in abridged dictionaries. Attendant with this benefit, may be increased user satisfaction because firstly, each character encoding is resolved and presented as a glyph at the conclusion of a keypad event, and secondly, less abrasion and fatigue on fingertips will occur.

An embodiment may enable a user to hasten inputs to a mobile station, thus permitting more rapid replies to queries that arrive by messaging or world wide web modes. In cases where a person is waiting to receive text entered in this manner, a quicker response may be perceived.

An embodiment may permit a user to rapidly, and without resort to a complex menu, transmit machine instructions from a mobile station through a simple gesture that may not include a keystroke. Similarly, a mobile station, to which such instructions are directed, may be controlled by gestures that are not dependent on a menu system. Such benefits, coupled with the highly visible gesture, may make such input and control methods easily learned and accepted amongst illiterate and semi-literate people.

An embodiment may have an orientation state that is sensed in response to voice or other calls. The orientation state may operate as a basis for selecting an announcement, wherein the announcement may provide a calling party a context in which the called party is taking the call. Benefits of this feedback system may include briefer calls to people who are traveling in vehicles.

An embodiment of the invention may visibly display to others at a distance that a mobile station has its ability to ring or alert disabled. Several benefits spring from this. First, on being picked up or re-oriented, a mobile station may select a different ring or alert to be enabled—largely transparent to the user. Second, a gesture, of e.g. placing a mobile face-down may send a not-too-subtle signal that all should do likewise—provided such a gesture is commonly known to silence a mobile station.

DETAILED DESCRIPTION OF THE INVENTION

Figure 1A:
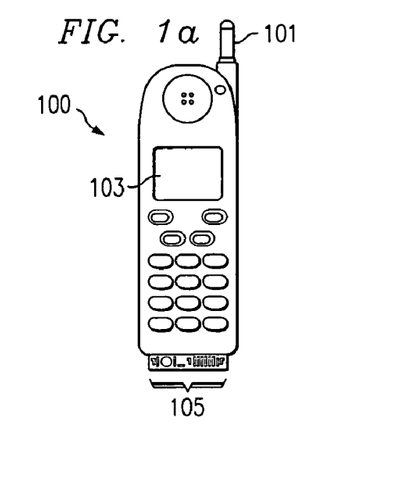
FIG. 1a is a mobile station of the prior art.
Figure 1B:
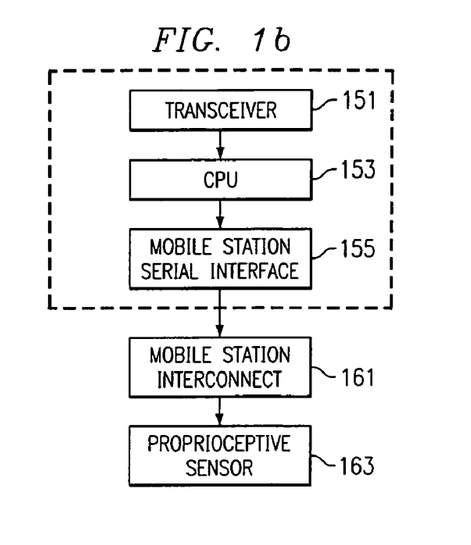
FIG. 1b is a block diagram of a mobile station with an embodiment of the invention.
Figure 1C:
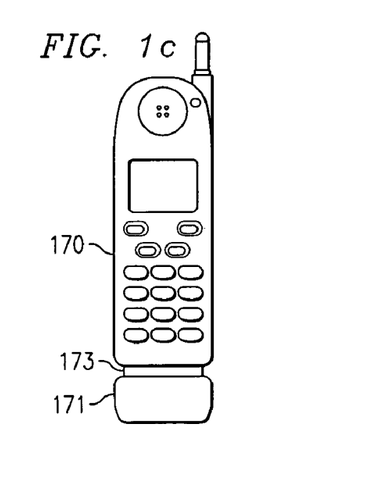
FIG. 1c is a view of a mobile station connected to an embodiment of the invention.

FIG. 1a shows a mobile station 100 of the prior art. The mobile station may have an antenna 101, a display 103 and a mobile station interface 105. The mobile station shown may be a mobile telephone, however it is appreciated that devices such as pagers may be mobile stations also. FIG. 1b shows a block diagram of a mobile station with the parts that comprise an embodiment of the invention. Mobile station may have a transceiver 151. The transceiver may be a transmitter that transmits sound or electromagnetic signals. The transceiver may include a receiver. Transceiver modulates data from a processor 153 onto a carrier for wireless transmission. The transceiver may receive signals and provide a demodulated data stream to the processor 153. The processor may provide data to and receive data from a physical port 155, which may be a serial interface. The embodiment of the invention may have a mobile station interconnect 161, which may couple a proprioceptive sensor 163 to the mobile station. The embodiment of the invention may be located within the common enclosure of the mobile station, or be an external accessory, which may be connected by wire. FIG. 1c shows the situation where the embodiment may be contained in a separate enclosure 171 and attach to a mobile station 170 through an external port of the mobile station. A connector 173 may attach by means known in the art the mobile station to the separate enclosure 171 housing the embodiment.

Figure 2:
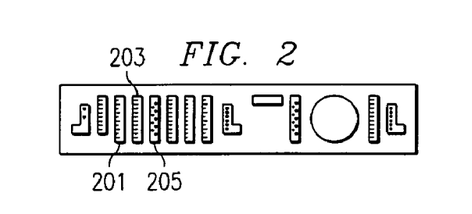
FIG. 2 shows a pin-out of a connector that may be used to connect an embodiment with a mobile station.

FIG. 2 shows a pin-out for an accessory cable that may be used with a popular mobile station design for the Nokia™ 6100 series mobile phone. Serial interface pins 201, 203 and 205 may be used to communicate with a mobile station, through an available serial interface protocol, e.g. universal asynchronous receiver-transmitter. Another embodiment may have the proprioceptive sensor internal to the mobile station enclosure and use a data bus as an alternative to the serial interface 151 and mobile station interconnect 161 combination. Outputs of a proprioceptive sensor may be in analog waveforms that are later converted to digital forms within the mobile station. A mobile station conduit of some kind must extend from the proprioceptive sensor so that the changes in state or mode of the proprioceptive sensor may be acted upon by an application. Such a mobile station conduit may include conductive traces on circuit boards and pins on a connector, e.g., mobile station interconnect 161. The mobile station conduit need not be a contiguous conductor, since electrical fields may pass signals between at least two conductive plates. Moreover, the mobile station conduit may pass signals encoded in the visible and near-visible spectrum. The mobile station conduit may be connectable to the transceiver of the mobile station, or the mobile station conduit may be connectable to an intermediate device, e.g. a processor or CPU of the mobile station, to filter or store signals carried by the mobile station conduit.

Figure 3A:
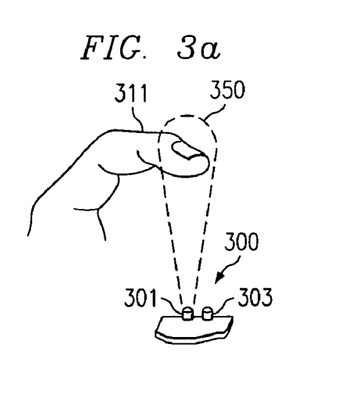
FIG. 3a is a view of a reflection detector portion of an embodiment interacting with an environment.

FIG. 3A shows a reflection detector 300 type of proprioceptive sensor. The reflection detector may operate using electromagnetic signals and reflections thereto. A suitable reflection detector may transmit and receive a sound for range-finding purposes as is known in the art. Alternatively, such a device may be made using a micro-impulse radar (MIR) as is known in the art. A cheap and reasonably accurate reflection detector 300 may be made using a directional transmitter paired with a directional receiver, such as an infrared transmitter 301 and an infrared receiver 303. The directional transmitter may transmit in at least one direction 350. The directional receiver may be sensitive to signals in substantially the same at least one direction 350. Typically such a device combination has an effective sensitivity for only a narrow beam in front of the device, and then, only to a limited distance. Reflection sensitivity will vary with a number of factors. Objects having high reflectivity in the spectrum being detected will produce a positive detection at a greater distance and with a smaller surface presented for reflection than an object that doesn't reflect well. Similarly, an object that is roughly orthogonal to the transmitted signal, e.g. the finger 311 of FIG. 3A, will provide a better reflection, than a pencil 313 of FIG. 3B that is obliquely presented to the beam.

Figure 3B:
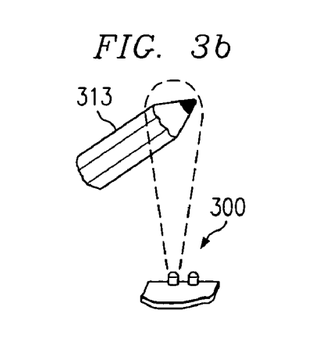
FIG. 3b is another view of a reflection detector portion of an embodiment interacting with an environment.

The reflection detector 300 does not necessarily detect the orientation of the device to which it is attached, e.g. a mobile station. Rather, the reflection detector 300 detects the relationship of the environment around the mobile station, e.g. a combination of alignment, proximity, reflectivity, size and squareness to the beam. Information from this data may be used to infer the orientation of the mobile station. A reason for using a reflection detector 300 as a means to detect positioning of a mobile station in relation to an object is that an infrared transmitter may be built into many mobile stations currently in use. Converting an infrared transmitter of a mobile station to a reflection detector has not been shown until now.

One way to avoid spuriously detecting reflection, e.g. incandescent light bulbs or sunlight, is to place a red filter over the infrared transmitter and receiver. In addition, the transmitter may be modulated using pulse width modulation. A receiver at the mobile station may reject all signals except those that match the modulation of the transmitter. Triggering detection of a reflection signal may be accomplished in two ways with a mobile station thus equipped. The first way is to re-orient the mobile station to point the detector at a reflective object when it is desired to detect a reflection. A second way is to move an object in front of the reflection detector. Such a relative position of the environment to the reflection detector is known as the reflect-mode, or simply 'reflect'. To end reflection, the mobile station may be pointed to a void, or at objects that do not reflect substantially. A mobile station embodiment that is in a position that fails to receive a sufficiently strong reflected signal is said to be in a 'neutral', or natural mode. Whether a reflected signal is sufficiently strong may be controlled by the inherent sensitivity of a receiver in the reflection detector. Suffice it to say that if the signal is below a magnitude the sensor provides a 'neutral' signal, and that above the magnitude, the sensor provides a 'reflect' signal. Orientation events may be transitions between the reflect-mode and the neutral-mode.

In a situation where the reflection detector is positioned on a long side of an oblong mobile station, the detector may detect reflection when the mobile station rests on the long side. Similarly, if the mobile station is dropped into a shirt pocket, the reflection detector may sense that as reflect mode. The states of 'neutral' or 'reflect' may be inferred to be orientation states. This is distinct from the notion of connectivity states, wherein a mobile station identifies a connection based on current or shorted circuits across pins at a mobile phone connector, by connecting a charger to a mobile station external connector or connecting to a mobile station headset.

Figure 4A:
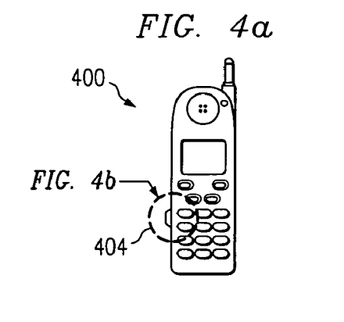
FIG. 4a is a view of a front of a mobile station having a reflection detector embodiment.
Figure 4B:
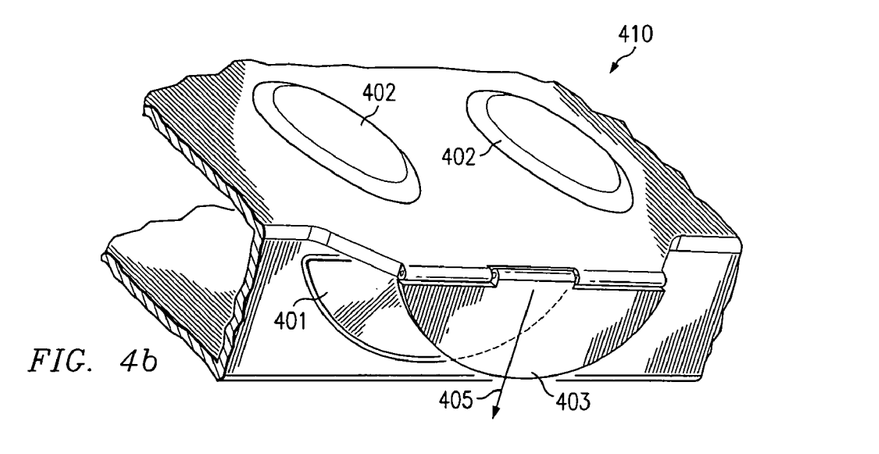
FIG. 4b is a close-up view of a front and side of a mobile station having a reflection detector embodiment operated under a first acceleration.

FIG. 4A shows a distant view of a reflection detector embodiment 400. An area of detail 404 is circled. A reflection detector may be built into a mobile station. The mobile station may have a CPU, a keypad and a display, wherein the CPU mediates the operation of the reflection detector with the other components of the mobile station. FIG. 4B shows a cut-away view of the area of detail including an object with which the reflection detector 401 interacts. The mobile station may have one or more buttons 402 located on a front side of the mobile station 410. The object may be a pendulum 403 suspended near the reflection detector 401, wherein the pendulum 403 may be attached to the mobile station 410. Such a pendulum 403 may swing in front of the transmitted signal of the reflection detector transmitter such that the pendulum 403 may be detected by a strongly reflected signal. A tilt of a mobile station 410 may move the pendulum 403 out of the way so that there is no reflection detected by the reflection detector 401. The pendulum may detect, in an approximate way, an acceleration vector 405 that points to the back of the mobile station. A reflected signal from the pendulum may be detected at the reflection detector 401 as a reflect mode.

Figure 4C:
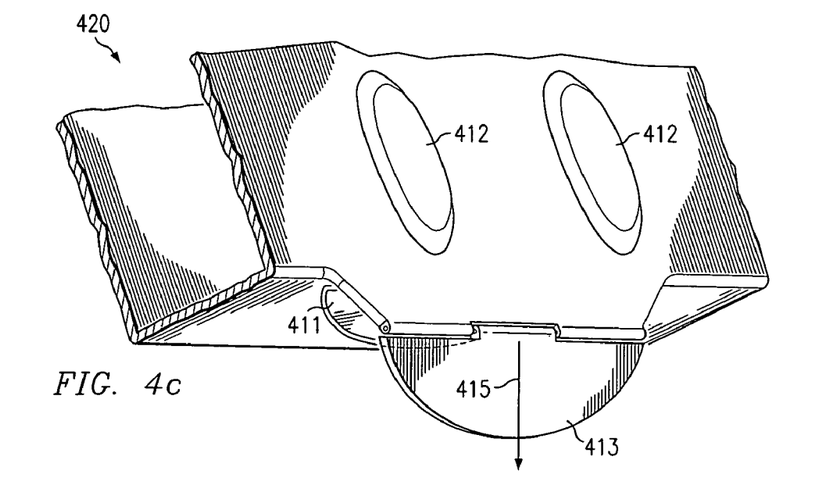
FIG. 4c is another close-up view of a front and side of a mobile station having a reflection detector embodiment operated under a second acceleration.

FIG. 4C shows the effects of tilting a mobile station such that the left side of the mobile station hangs lower than the right side of the mobile station, or where the effects of movement may pull the acceleration vector outward and away from the mobile station body. Again, there is a pendulum 413 attached to the mobile station 420. The reflection detector 411 may transmit a beam away from the mobile station. The pendulum 413, acted on by gravity and other accelerations, hangs or swings towards an acceleration vector 415. Thus the reflection detector may detect an acceleration vector 415. Because the pendulum 413 may be moved out of the way of a transmitted beam, or otherwise is unable to reflect a sufficiently strong signal back to the reflection detector 411, the reflection detector may provide a neutral mode signal to any processor to which it is operatively coupled. Thus it is seen that the reflection detector may not necessarily detect strict orientation, but rather the reflection detector detects changes in the environment in the vicinity of the beam cast by the reflection detector.

A keypad event may occur in several ways. A key may be pressed, and a circuit closure or other indicator of pressure may be detected, the so-called, key-down event. This action is well known for devices having key-dome switches under a rubber or plastic key. Less known is that a key-down may occur in a graphics tablet or other pointing device where the location of a stylus is mapped to a key. A good example of this would be where a personal digital assistant (PDA) has a hunt-and-peck keyboard displayed to its pressure sensitive display screen. Therein, a key-down event occurs when a stylus strikes a surface having the appropriate character symbol or function name. A pressure sensitive display screen may be an input device for a mobile station. Generally, any device capable of sensing pressure changes may be used in lieu of a keyboard to detect key-down and key-up events. Thus applying sufficient pressure on such a device provides a signal that operates as a key-down event. Conversely, upon removing sufficient pressure, a key-up event is provided. For example, in a PDA context, this may occur when a stylus is lifted.

A key-duration may be the time between a key-down event on a particular key, and a key-up event on that same key. A key-duration may be the time between a key-down-event on a first key and a key-down event on a second key prior to a key-up event on the first key.

A dwell period may be a preset duration wherein any key-duration longer than the dwell period is registered to be a hold-down event. The dwell period may be established according to the preferences of the user. A hold-down event is also a keypad event. Similarly, a key-punch may be an occurrence of a key-duration shorter than the dwell period.

Selection of a character encoding or function associated with a key may occur by a combination of at least one keypad event, and the mode of the reflection sensor, which may be either neutral or reflect. A brief key-press or key-punch is any key-press having a key-duration shorter than the dwell period. Because keypunches may be easier and quicker to make than longer key-presses that are detected as a hold-down event, a character assignment of frequently used characters to such acts is preferred. Moreover, since it is believed that for most situations using infrared sensors a mobile station will have predominantly voids around it, a neutral mode will predominate and be easier to achieve than the reflect mode. A quadruplet scheme of selecting one of four characters on a single keypress may include selecting a first character on detecting a key-down event in neutral; selecting a second character on detecting a key-down event in reflect; selecting a third character on detecting a hold-down event in neutral and selecting a fourth character on detecting a hold-down event in reflect.

TABLE 1

| I | Keypunch neutral | Keypunch reflect | Hold-down neutral | Hold-down reflect |
|---|---|---|---|---|
| II | I | M | 1 | G |
| III | A | B | 2 | Q |
| IV | E | F | 3 | X |
| V | H | L | 4 | J |
| VI | U | W | 5 | Z |
| VII | N | C | 6 | K |
| VIII | S | P | 7 | ' |
| IX | T | R | 8 | , |
| X | D | V | 9 | Y |
| XI | Space | O | 0 | . |
| XII | Key-down; key-up | Key-down; in-event; key-up | Key-down; in-event; out-event; key-up | In-event; key-down; key-up |

Table 1 shows a mapping of keys that could be used with the four keypress-combined-with-reflection events in row I. This scheme of selecting characters is known as the key-duration method, wherein the duration of the key-press influences the character encoding selected.

An alternative scheme of selecting character encodings is known as the event sequence method. For example, row XII shows keypad events using combinations without reference to dwell periods. An in-event may be the act of putting a reflector in the detection zone, i.e. making a transition from neutral mode to reflect mode. An out-event may be the act of removing a reflector from the detection zone, i.e. making a transition from reflect mode to neutral mode. Row XII in table 1 shows events that may each comprise key-down and key-up events, wherein the occurrence of the key-up triggers a character selection based on the previous at least one keypad event or orientation event.

As an example, if a key having the identity shown in row II is pressed, e.g. by a keypunch, the orientation of the mobile station may influence the selection of the character encoding that the CPU will assign to the event. In this situation, the selection of the letter 'I' or the letter 'M' is based on the orientation state of either 'neutral' or 'reflect' as is detected from the reflection detector. For example in the American Standard Code for Information Interchange (ASCII), such letters have character encodings of 73 and 77 respectively. A CPU may, if it operates using ASCII encodings, select from the set of character encodings, 73 and 77, the one character encoding based on the orientation state. A set of character encodings may be more than two character encodings in a situation where a proprioceptive sensor has more states or modes that it can detect. A tilt sensor may be able to detect a tilt in a negative direction to the horizon, or a positive tilt to the horizon. In addition a tilt sensor may be able to detect the substantial absence of tilt. Thus a spectrum of tilt could be broken up into several ranges, each assigned to a character encoding from among several character encodings in a set of character encodings. Thus upon detecting a keypad event, an orientation state such as tilt could be what a CPU bases selection of characters upon.

Both the quadruplet scheme, and the event sequence scheme are methods that convert an ordinary keypad event to a character encoding based on the orientation or other state of the proprioceptive sensor. The proprioceptive sensor may be installed as a peripheral device to a mobile station and enclosed in a separate peripheral enclosure, yet coupled by a connector to the mobile station. The peripheral enclosure may include a lookup table that is indexed by bits of a digitized key signal arriving from the mobile station, and with at least one additional bit established by the state of the proprioceptive sensor. The resultant data looked-up may be transmitted back to the mobile station from the peripheral enclosure using interface methods known in the art. In such a configuration, the proprioceptive sensor, and attendant look-up table are a kind of filter for converting a limited set of digitized signals to a richer set of digitized signals that span a greater number of character encodings.

A mobile agent is a program that operates on a mobile station and provides a number of functions, including for entertainment. Because a principal function of mobile entities is to entertain, a mobile entity may use several outputs of a mobile station, or other device. Singing or talking output may make use of a speaker. Animation may make use of a display output and any associated lights. In addition a mobile entity may trigger vibration functions or the transmission of data through a wireless port.

Mobile entity commands may be detected by a mobile station by sampling the outputs of a proprioceptive sensor over time and matching the waveforms of, e.g. tilt in a first direction and in a second direction, against various profiles or filters. A proprioceptive sensor, such as an inclinometer may detect more dynamic movements of the mobile station. For example, swinging of the device will provide a fairly low frequency oscillation in an acceleration vector detected by an inclinometer. Shaking the device will generate a higher frequency oscillation, to the acceleration vector, perhaps with a greater magnitude. An inclinometer located away from a mobile station's center of gravity may detect a spinning motion as a large amplitude acceleration vector pointing down and away from the axis of rotation which may gradually settle into a straight down acceleration vector. The changes in the acceleration over a input sampling period, such as, for example a few seconds, may be used to select a function in a mobile entity, which may be perceived as a behavior of an animation on a display and any associated output of the mobile station.

Such inputs delivered through the proprioceptive sensor may elicit a functionality only available in mobile stations, which is the ability to transmit a message through a wireless port. In some cases, the message may be a set of instructions. The transmitted instructions may be a copy of any instructions that govern the behavior of the mobile entity on the mobile station. Transmitting such instructions is known as propagating the mobile entity. This is true even if no device is able to receive and store these instructions.

Moreover, a mobile device that is capable of receiving such instructions may be commanded to do so by input detected through the proprioceptive sensor. The instructions may be evaluated and moved to different parts of memory also based on inputs of the proprioceptive sensor. In addition, the instructions may be discarded based on an input of the proprioceptive sensor. In short each of the mobile entity commands may control the reception, operation, and removal of mobile entity instructions.

The foregoing mobile entity commands are by no means a complete catalog of all distinguishable movements of a mobile station that may be detected through a proprioceptive sensor. Such movements may be an intricate choreography of gestures which may occur over an extended period of time. A string of movements could be a word, wherein the simplest movement distinguishable by a CPU of a mobile station is called a gesture. Upon detecting a completed gesture, a sound or other output may be issued through the mobile station speaker. Other outputs, such as light or vibration may signal as feedback the detection of a complete gesture. Such a feedback may be uniquely paired or associated with the gesture detected.

For example, a musical note of 'C' may be played via a mobile station speaker if the mobile station senses a swinging gesture. In the same example, a musical note of 'A' may be played if the mobile station when the mobile station senses a shaking gesture. In the example the note of 'C' is played for no other gesture, and the musical note of 'A' is played for no other gesture.

A specialized program operating under the programmed control of a mobile station having a CPU coupled to a proprioceptive sensor may issue a feedback response to a calling voice device. As an example, an inclinometer may be the proprioceptive sensor. Such a feedback response may be an out going message, however the feedback response may be something involving transfer of less data traffic, e.g. ringing tones audible in the earpiece or speaker of the calling device.

Figure 5A:
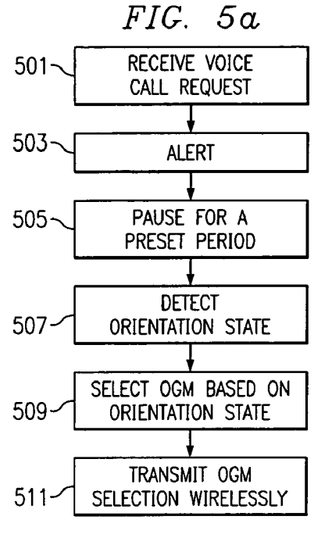
FIG. 5a is a flow-chart of steps to select an announcement according to an embodiment of the invention.

FIG. 5a shows some steps that may be performed by a mobile station receiving an incoming wireless signal, such as a call request. A call request may be a preliminary data message to a mobile station, which may include a page. The call request may be a voice call request. The first step may be to receive a voice call request 501. The mobile station may respond with an alert 503, wherein an audible sound may be made at the mobile station, through, e.g. a speaker. The CPU may sense the orientation of the mobile station to detect an orientation state 507. The orientation may be sensed several times to detect the presence of acceleration or changes in acceleration.

For example the vector of acceleration shown by an inclinometer may change over a few seconds to reflect activities such as walking. Moreover, by extracting a predominant frequency of any oscillation in the vector a change in acceleration or orientation may be mapped to an activity. A simple waveform fitting a sampling of data may be a substantially unchanging, and steady acceleration through the front face of the mobile station. If the sampling of a proprioceptive sensor such as an inclinometer is within a tolerance of the same vector, then a selection of an announcement, which may be an out going message (OGM) 509, may be made on that basis. This functionality works best under the assumption that the user of the called mobile station oriented the mobile station in a deliberate manner to convey the situation the owner is in. In order to permit a user to re-orient a mobile station following an alert 503 to clarify the situation, the mobile station may be set to pause 505 for a predetermined period, thus providing time to grasp the mobile station and signal the new situation of the user by adjusting its position. Some situations that correspond to a position or orientation of the mobile station are enumerated in table 2. In table 2, the announcement listed alongside each position is a message that may be stored in the mobile station, or in a relay device. Selection of the message 509 may be by simply selecting an index to the message. The index of the announcement may correspond to the content of the message. The index of the announcement may correspond to the mode of delivery of the message, e.g. the mode may be a voice message (e.g. OGM), a text message (e.g. a page), or a culturally accepted feedback such as, e.g. a tone, vibration or lighting effect of the calling device. If the calling device is a mobile station, then there may be more available modes to select from to provide feedback. The culturally accepted feedback may be encoded on a few bits of data that the calling device is able to interpret as distinct from an inbound call. The index of the message, e.g. OGM selection, may be transmitted 511 using a few bits modulated on a wireless carrier as is known in the art. The relay device may select a larger piece of multimedia feedback data for transport over a voice channel to the calling device. If the calling device is a mobile station a wireless signaling channel may be used to carry the mode or content to the calling mobile station. The relay device may be a cellular base station, or a telephony switch.

Figure 5B:
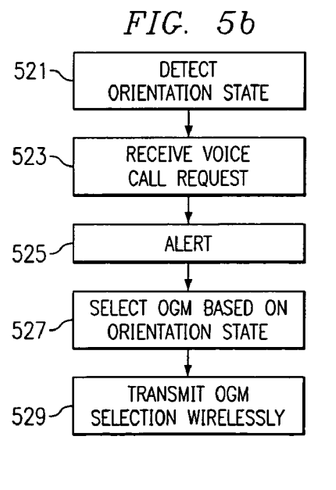
FIG. 5b is a flow-chart of steps to select an announcement according to another embodiment of the invention.
Figure 5C:
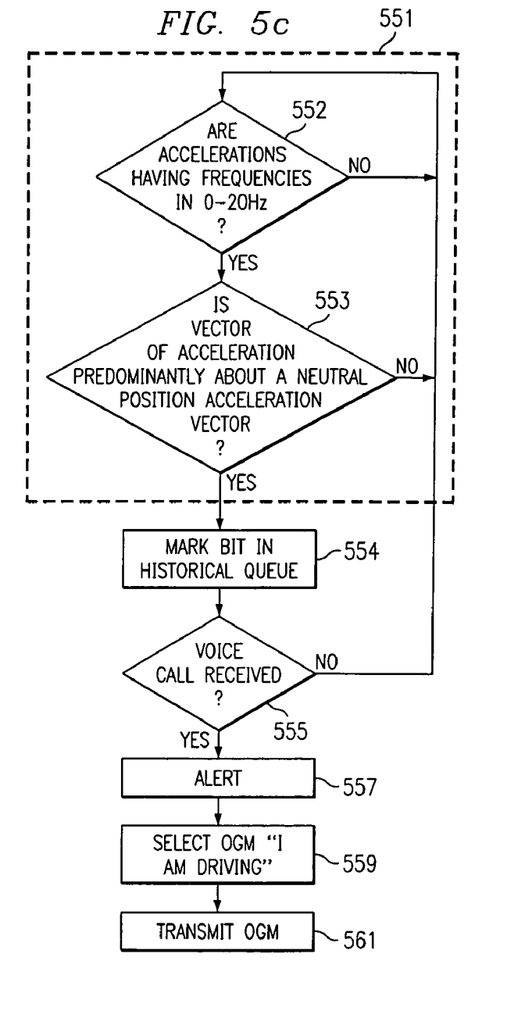
FIG. 5c is a flow-chart of steps to select an announcement according to yet another embodiment of the invention.

FIG. 5b shows an alternative method of selecting an announcement that includes detecting an orientation state in advance 521, which may be accompanied by storing that orientation state in memory, such as a historical queue. An incoming signal, such as an incoming call 523 may initiate a process, which includes making an alert 525. A CPU of the mobile station may select the announcement 527, which may be an OGM. The CPU of the mobile station may command the transceiver to send out the announcement selection 529.

Announcements associated with a mobile station position or orientation are shown in Table 2. An announcement message, coupled to mobile station positions may become customarily standardized to establish better etiquette in the use of mobile stations. Moreover, such minor ceremonies are much more obvious than button pressing and may be a better way to communicate to others that are in sight of the mobile station user, of the user's intentions relating to incoming calls. Such announcements may be mere index numbers. Such announcements may be outgoing messages or multimedia streams.

TABLE 2

| index | Position | Message |
| --- | --- | --- |
| 1 | Facing down: | Phone owner is eating or sleeping |
| 2 | On left side: | Phone owner is engaged in water sports |
| 3 | On right side: | Phone owner is travelling or in meetings |

FIG. 5b shows a procedure that may be used for purposes of signaling to a calling party the current or recent operation of a vehicle. The step of detecting an orientation state 551 may be a continuous sampling of an inclinometer or other proprioceptive device to detect oscillations 552, e.g. 0 to 20 Hz frequency domain, of a magnitude and frequency associated with a moving vehicle. Marking a bit in the historical queue 554, a sufficient sampling window to sample the occurrence of the vehicle moving between stops may be necessary. In addition, once sampled data that is too old is discarded, a sequence of bits or historical queue, say 10 long, may indicate for each sampling period, say 30 seconds long, if characteristic vibrations of a moving vehicle were detected. An orientation state of 'moving vehicle' may be a state wherein there are detected characteristic frequencies of vehicle movement during at least one period in the historical queue. An additional criteria 553 may be a determinative factor in establishing that accelerations are caused by a vehicle operating on a mobile station affixed to an established position where an acceleration due to gravity always points in the same direction—a neutral position acceleration vector.

A call may be received 555, which may be indicated by an alert 557. Because a bit may have been marked in the historical queue recently, an announcement of "I'm driving" may be selected 559. Subsequently, the announcement, either as an index or as a stream of data may be transmitted 561 to the calling device.

Since the oscillations associated with movement on foot, e.g. about 0–3 Hz, may overlap with frequencies associated with vehicle movement, the relative position of the mobile station to the moving body may be taken into account.

Figure 6A:
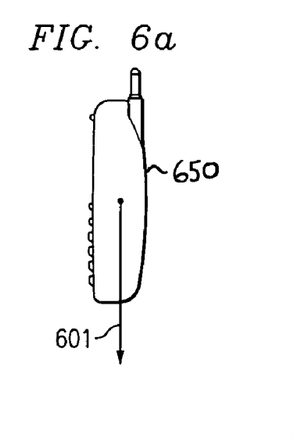
FIG. 6a is a side view of a mobile station operating with acceleration through the base of the mobile station.
Figure 6B:
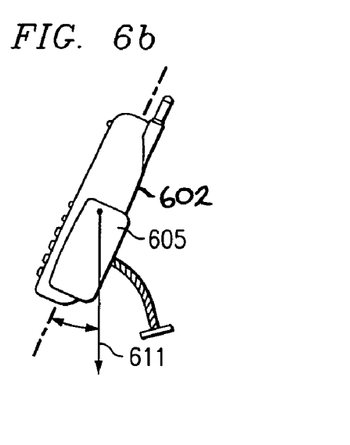
FIG. 6b is a side-view of a mobile station secured to a car-kit.

FIG. 6a and FIG. 6b show measurements of tilt or acceleration vectors in a plane that passes through the center of a mobile station. Such measurements may be sensed by a one-axis inclinometer installed in the mobile station. The measurements may sense to what extend a longitudinal axis through the mobile station 650 is elevated from the horizon, or other reference.

If the vector of acceleration 601 is predominantly directed toward the base of the mobile station as in FIG. 6a, then oscillation that fits the profile of 'moving vehicle' and 'moving person' may be determined to be the orientation state of 'moving person'. If the vector of the acceleration 603 is predominantly directed toward a direction established by a car-kit mount 605, then a selection of the orientation state of 'moving vehicle' is selected.

Figure 6C:
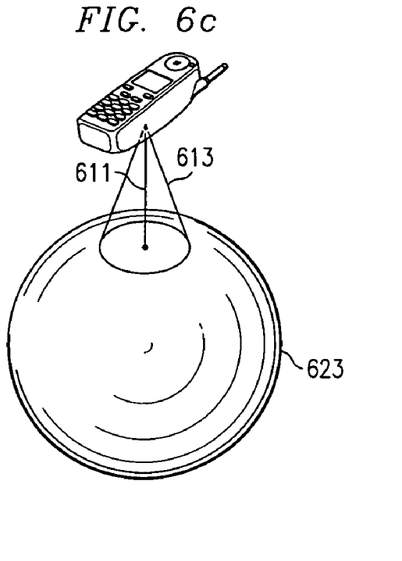
FIG. 6c is a mobile station showing a space of possible acceleration vectors.

FIG. 6b shows a mobile station mated to a car-kit mount 605. While at rest, a mobile station 602 may read data from an inclinometer showing an acceleration vector 611 that points roughly downward. Such a vector may be recorded in the mobile station as a preset neutral position acceleration vector 611. If a recent set of measurements of a one-axis inclinometer averages within a certain tolerance of the neutral position acceleration vector 611, such data may be determine that a mobile station is in a 'moving vehicle state' in a decision process. The decision process may have as a prerequisite to such a determination, a requirement that movement of an acceleration vector having oscillations in a predetermined range is detected. FIG. 6c shows how a more elaborate inclinometer may measure tilt in two axes. Such a tilt, or measurement of acceleration, may be represented as a vector in three-dimensional space. The vector space 613 in the vicinity of a neutral position acceleration vector 611 may be treated as associated with the 'moving vehicle' orientation state. Such a vector space 613 may include all vectors within a fixed angle or tolerance of the neutral position acceleration vector 611. Such a vector space 613 may be conical, or pyramidal in shape. A step of detecting an orientation state may average acceleration vectors over time.

If that averaged vector lies on a sphere 623 outside the vector space 613, then the 'moving person' orientation state may be selected.

A processor may provide a message in text format, such as by Short Message Service or other messaging service to a caller, using addressing information available through automatic number identification or caller ID.

Other methods may be used. For example, the processor may send a few bytes to a relay device, such as a telephony switch, that command the switch to select an alternative outgoing message (OGM), which may be a multimedia stream. Such an alternative OGM, or index to OGM storage, may be one that suggests the owner's condition, wherein the OGM may be a prerecorded message stored and retrieved by means known in the art. The processor may react at the first call ring, or following two rings. In the later case, the user of the mobile station may react in time to change the orientation of the phone to alter the operation of the mobile entity.

An alert may be any output of a mobile station that is reasonably calculated to be perceived by a user of the mobile station in some circumstances. An alert may include displaying a symbol on a display, activating a light, making a tone or a vibration, or the absence of these outputs when such outputs were previously provided. The alert step may follow the orientation detection state. The mobile station may detect orientation several times during an incoming call, and while a call is in progress. Detection of orientation may occur several times during an incoming call. An alert may be selected based on the orientation detected.

Figure 7:
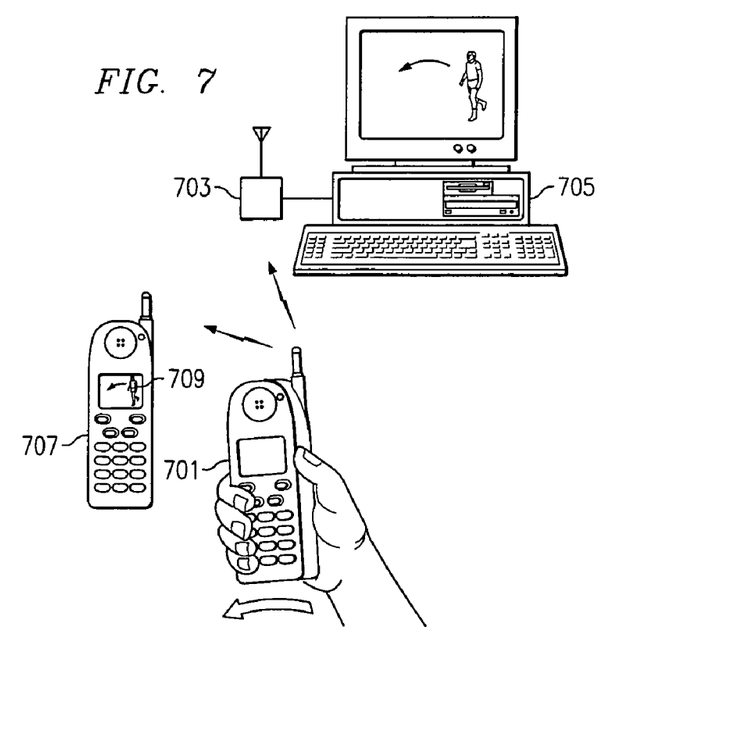
FIG. 7 is a mobile station having an embodiment of the invention communicating with other devices.

Command and control of a mobile agent in a nearby device may occur in several modes. In all cases there is a proprioceptive sensor that may transmit an encoded orientation or a sensed change in orientation via a wireless transmitter on board the mobile station. FIG. 7 shows a mobile station 701 equipped with an embodiment tilted to the left from a comfortable hand-held upright position. The direction and magnitude of the tilt may be an orientation, particularly with respect to an apparent center of the earth. Such an orientation may be transmitted a short distance, by e.g. a short range radio transmitter to a corresponding receiver 703. The orientation may be transmitted to a central processing unit of, e.g, a personal computer 705. The orientation may be transmitted to a central processing unit of, e.g. a second mobile station 707 equipped with a central processing unit.

A mobile agent, e.g., a mobile entity, may operate using such an orientation as a command. A rudimentary command associated with a left orientation may be a command that the mobile agent should move to the left—wherein an animated figure 709 of a display is caused to make a leftward movement on the display. A more sophisticated command may be to move the mobile agent to the left, and if the mobile agent, as displayed, has reached the left-most portion of a display, then the mobile agent should transmit a copy of itself, in machine independent instruction form, over a wireless link to a mobile station that is nearby. The original copy of the mobile agent may be deleted from the memory of the first mobile station contemporaneously with a second copy of the mobile agent arriving and being stored in the memory of a second mobile station.

The aforementioned command may be one of many to control movement, transmission and propagation of a mobile agent. Moreover, such a command may be recorded and inherited by a mobile agent to influence later behaviors, in effect changing the probability that certain code branches may be taken of the mobile agent.

Just as an orientation may form the basis of a mobile station moving from a remote mobile station to another device having a CPU, an orientation may form the basis of either transmitting a mobile agent from the mobile station, which is mechanically mated to the proprioceptive device. In other words, a tilt or orientation of the mobile station may command a mobile agent to transmit a copy of itself to a nearby device over a wireless link. In addition, the orientation of a device may be used as a command to refuse receiving a mobile agent. Such a refusal may be done by refusing with a responsive communication to establish a protocol to transfer the mobile agent with a second device. Such a refusal may be done by refusing to store in memory.

A mobile entity may be controlled in ordinary interaction by transmitting to it character code such as those specified in table 1. Such character codes, once received by a CPU hosting the mobile agent, may operate to select from a range of options, answer questions posed by the mobile agent, or prompt the mobile agent to perform an act, among other things.

An onboard accelerometer may detect vibrations above 10 Hz and interpret such vibrations as evidence of road vibration. The presence of such frequencies for periods longer than a short time, e.g. 10 seconds, during a preceding 10 minute period may cause a mobile entity to send a text message to a caller that it is likely that the called party may be driving.

Although the invention has been described in the context of particular embodiments, various alternative embodiments are possible. Thus, while the invention has been particularly shown and described with respect to specific embodiments thereof, it will be understood by those skilled in the art that changes in form and configuration may be made therein without departing from the scope and spirit of the invention.

What is claimed is:

1. A user status device for a mobile station having at least one wireless transceiver comprising:
    a proprioceptive sensor having a state; and
    at least one mobile station conduit coupled to the proprioceptive sensor for carrying a signal of the proprioceptive sensor to the mobile station, further comprising a processor for converting a keypad event to a character encoding selected from a set of character encodings based on the orientation state.

2. The user status device of claim 1 wherein the processor comprises a mobile station coupled to the mobile station conduit.

3. The user status device of claim 1 wherein the proprioceptive sensor further comprising:
    a reflection detector.

4. The user status device of claim 3 wherein the orientation state comprises:
    a reflect state wherein said reflection detector detects a reflection signal above a magnitude.

5. The user status device of claim 3 wherein the orientation state comprises a neutral state wherein said reflection detector detects a reflection signal below a magnitude.

6. The user status device of claim 3 wherein the reflection detector further comprises:
    a directional transmitter transmitting a signal in at least one direction;
    a directional receiver sensitive to the signal in the at least one direction; and
    a pendulum attached to the mobile station near the directional receiver.

7. The user status device of claim 1 wherein the proprioceptive sensor comprises an inclinometer having a state selectable from at least two orientation states.

8. The user status device of claim 1, wherein the processor comprises:
    means for detecting a first keypad event and a first orientation state; and
    means for selecting a character encoding based on the first keypad event and first orientation state.

9. The user status device of claim 8, wherein the means for detecting comprises a means for detecting a key-up event and a key-down event for a key of the mobile station.

10. The user status device of claim 1, wherein the processor comprises:
    means for detecting at least one keypad event selected from at least two keypad events; and
    means for selecting a character encoding based on the at least one keypad event and the state.

11. A user status device for a mobile station having at least one wireless transceiver comprising:
    a proprioceptive sensor having a state; and
    at least one mobile station conduit coupled to the proprioceptive sensor for carrying a signal of the proprioceptive sensor to the mobile station, wherein the mobile station has a processor and a local storage and a keypad having at least one key, the user status device comprising:
        means for converting a keypad event to a character encoding selected from a set of character encodings based on an orientation state.

12. A method to control an entity in a mobile station having at least one wireless transceiver, the entity being responsive to a plurality of commands for eliciting a plurality of entity functions, comprising:
    detecting an acceleration vector of a proprioceptive sensor; and
    transmitting a message through the at least one wireless transceiver based on the acceleration vector, the message comprising at least one instruction that governs behavior of the entity wherein the message is used to control movement of an entity in another device.

13. A method to propagate a mobile entity from a first wireless device to a second device, comprising:
    detecting an orientation of the first wireless device from an output of a proprioceptive sensor;
    based on the detected orientation, changing a display of at least a location of the mobile entity on a display device of the first wireless device;
    if the changed display of at least the location of the mobile entity meets a criterion, transmitting a description of the mobile entity from the first wireless device to the second device, and
    storing the description in a memory of the second device and displaying the mobile entity on a display of the second device.

14. The method of claim 13, further comprising deleting the description of the mobile entity from a memory of the first wireless device.

15. A method to send a mobile entity from a first wireless device to a second device, comprising:
    detecting a change in an orientation of the first wireless device from an output of a proprioceptive sensor; and
    based on the detected change in orientation, transmitting a description of the mobile entity from the first wireless device to the second device; and determining whether to accept or refuse the transmitted description based on an orientation of the second device as detected from an output of a proprioceptive sensor of the second device.

16. A wireless device comprising a wireless transceiver, a visual display, a memory, a proprioceptive sensor and a data processor operating under control of a stored program having program instructions to propagate a mobile entity from the wireless device to another device, comprising first program instructions to detect an orientation of the wireless device from an output of the proprioceptive sensor; based on the detected orientation, second program instructions to change a display of at least a location of the mobile entity on the visual display; third program instructions, responsive to changed display of at least the location of the mobile entity meeting a criterion, to transmit a description of the mobile entity via the wireless transceiver to the another device for storage of the description and display of the mobile entity on a display of the another device.

17. The wireless device of claim 16, further comprising additional program instructions to delete the description of the mobile entity from the memory of the wireless device.

18. A wireless device comprising a wireless transceiver, a proprioceptive sensor and a data processor operating under control of a stored program having program instructions to send a mobile entity from the wireless device to another device, comprising first program instructions to detect a change in an orientation of the wireless device from an output of the proprioceptive sensor; and second program instructions, responsive to the detected change in orientation, to transmit a description of the mobile entity via the wireless transceiver to the another device and further comprising additional program instructions to determine whether to accept or refuse a received description of a mobile entity based on an orientation of the wireless device as detected from the output of the proprioceptive sensor.

* * * * *